Aug. 2, 1960     S. H. HARWIG     2,947,939
TESTING ELECTRICALLY CONDUCTIVE ARTICLES
Filed Sept. 24, 1956

INVENTOR.
Stephen H. Harwig
BY
Nobbe & Swope
ATTORNEYS

United States Patent Office 2,947,939
Patented Aug. 2, 1960

2,947,939
TESTING ELECTRICALLY CONDUCTIVE ARTICLES

Stephen H. Harwig, Pittsburgh, Pa., assignor to Libbey-Owens-Ford Glass Company, Toledo, Ohio, a corporation of Ohio Filed Sept. 24, 1956, Ser. No. 611,512
6 Claims. (Cl. 324—65)

This invention relates to electrically conductive articles and more particularly to a method and apparatus for testing electrically conductive films on such articles.

Although the invention is in no way restricted to any particular article or type of electrically conducting film, it has proved valuable in connection with transparent electrically conducting films of gold, silver, copper, iron and nickel as described in Patent No. 2,628,927, issued February 17, 1953. Articles produced according to this patent have been used for many applications including the prevention of ice, fog, and static electricity effects on aircraft and automotive windshields, lenses, camera windows and the like.

When used for such purposes, the electrically conductive films should be optically perfect and must be within precise resistance limits to produce the required heating characteristics. Because of these requirements, it is desirable to test the films before permanent electrodes or bus bars are placed on the film so that corrections may be made without requiring that the electrodes be removed.

Heretofore, the units were tested after the electrodes had been permanently adhered to the film. Consequently, if it was desired to make alterations in the film, it was generally necessary to remove the electrodes. This rendered the units susceptible to marring, scratching and breakage, which because of the optical and electrical characteristics required, resulted in considerable losses.

Thus, by testing the unit in advance of placing the electrodes thereon, it is possible to effect considerable savings both in labor and article costs by determining the characteristics which will have an affect on the end product.

Thus, it is a primary object of the invention to provide a novel method and apparatus for testing electrically conductive articles before fabrication is completed.

Another object of the invention is to provide a method of testing electrically conductive films without the necessity of first applying permanent electrodes or bus bars.

Another object of the invention is to provide apparatus which can be used to apply power to electrically conductive films such that it is not necessary to utilize electrodes adhered to the films.

A further object of the invention is to provide a novel method and apparatus for nondestructably testing electrically conductive films on support bodies.

A still further object of the invention is to provide a method and apparatus for testing an electrically conductive film by the use of an electrically conductive liquid medium under pressure.

Other objects and advantages of the invention will become more apparent during the course of the following description when taken in connection with the accompanying drawings.

In the drawings wherein like numerals are employed to designate like parts throughout the same:

Heretofore, it has been generally necessary in producing electrically conducting articles to place electrodes on the electrically conducting film on the article in a permanent fashion before the article could be tested. As pointed out hereinbefore, this procedure makes it relatively impossible or extremely expensive to alter the unit after the electrodes have been placed in contact with the film because of the necessity to chemically treat, scrape or abrade the electrodes in the removal process. This of course can result in scratches on the article which make it unacceptable and consequently a total loss.

According to the present invention, the necessity for applying permanent bus bars to electrically conducting articles before they are tested is eliminated by placing a support body having an electrically conductive film thereon in contact with spaced baths of an electrically conducting liquid which are placed in contact with the film along the areas where the bus bars or electrodes would normally be placed. Power is then applied to the electrically conducting liquid and thence through the electrically conducting film.

Figure 1:
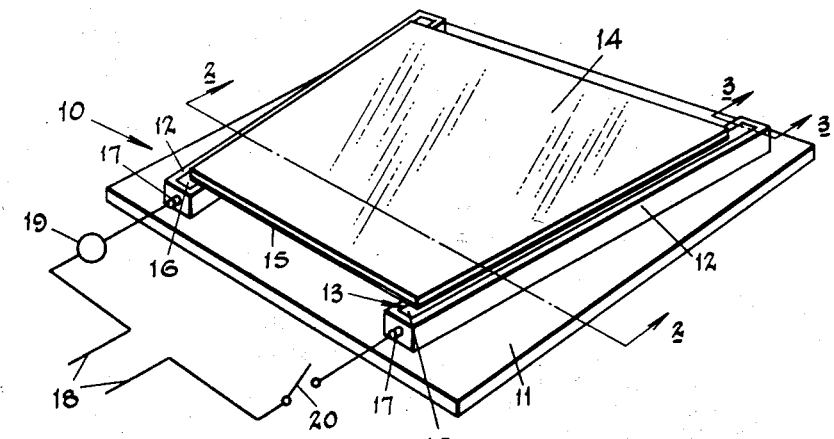
Fig. 1 is a perspective view of the apparatus of the invention illustrating an electrically conductive article in position thereon.

With reference now to the drawings, the apparatus of the invention illustrated in Fig. 1 is designated in its entirety by the numeral 10. More particularly, the apparatus may comprise a base plate 11 formed of wood or metal depending upon the characteristic desired, and container blocks 12 having an elongated channel 13 therein. These channels may be adjustably mounted on the base plate so as to be moved relative to one another and relative to the plate to accommodate changes in the type and contour of the electrically conductive article being tested.

Figure 2:
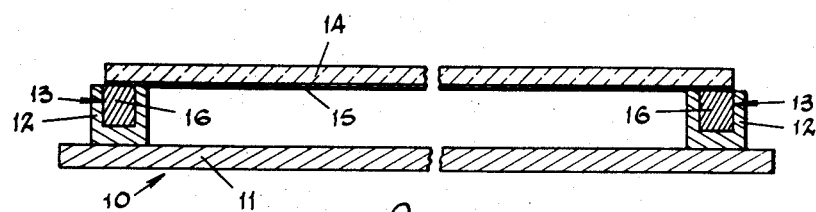
Fig. 2 is a sectional view taken substantially along lines 2—2 of Fig. 1.

As shown in Figs. 1 and 2, an electrically conducting article comprising a support body 14 having an electrically conducting film 15 thereon is supported above the blocks 12 such that the areas of the electrically conductive film where the permanent electrodes will be placed to extend over the channels 13 in the blocks. To bring power to the film, a pliable bath of an electrically conducting medium indicated at 16 is placed in the channels 13 and retained at a level such that it will make direct contact with the film along the area of the film where the bus bars will be permanently attached.

Figures 3, 5:
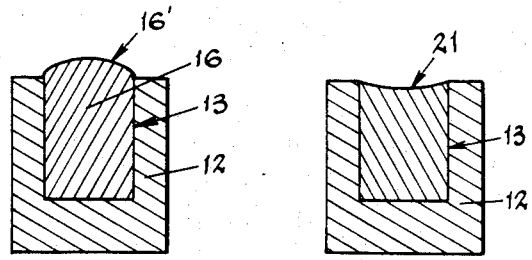
Fig. 3 is an enlarged sectional view of a channel container of the invention taken substantially along lines 3—3 of Fig. 1.
Fig. 5 is an enlarged sectional view of a channel container of the alternate embodiment shown in Fig. 4, showing the use of an electrolyte.

In order to assure full and complete contact with the film, it is generally desirable to use a liquid having a convex meniscus such as mercury as illustrated at 16' in Fig. 3. Liquids of this type extend beyond the upper edge of the block and permit the electrically conducting film to make contact with the liquid as the support body 14 is supported by the container blocks 12. While mercury is preferred, other materials having a convex meniscus when in a liquid state may be used such as cesium, gallium and rubidium which may be liquid when maintained at relatively low temperatures of about 29 to 38° C., or electrolytes and other liquids having a concave meniscus may be used positioned in the block such that they make smooth even contact with the electrically conductive film.

The blocks 12 may be formed of any suitable material and preferably a material which is inert to the liquid electrically conductive medium 16. This being the case, wood has been found extremely desirable when mercury is used. Likewise, the electrically conductive medium should be such that it does not seriously react with the electrically conductive film on the support body.

Power is brought to the electrically conductive liquid medium through lugs 17 which extend through a wall of the blocks 12 so as to be in contact with the medium. If desired, an inert wire such as gold may be inserted through the wall of the blocks instead of the lugs 17. As herein shown, the lugs are connected to an outside power source indicated at 18. A wattmeter, ohmmeter, or other measuring instrument 19 may be connected in the power circuit and a switch 20 may be used to interrupt the circuit as desired.

Figure 4:
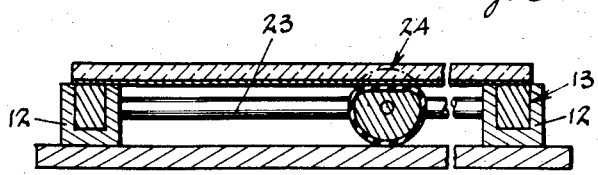
Fig. 4 is a cross-sectional view of an alternate embodiment of the apparatus of the invention.

An alternate embodiment of the invention is shown in Figs. 3 and 4, which differs from the embodiment of Figs. 1 to 3 in that means are provided for placing the electrically conductive medium in the channels 13 under pressure so that the medium is forced into contact with the electrically conductive film. This is extremely desirable when an electrolyte or other material having a concave meniscus as shown at 21 in Fig. 5 is used. As may be seen in Fig. 4, the pressure means includes a pliable bulb 22 positioned between the container blocks 12 and connected by tubes or pipes 23 to the channels 13 in the blocks.

In use, a support body 14 having an electrically conductive film 15 is supported on the blocks 12 in a position such that the channels 13 are below the area of the electrically conductive film where the permanent electrodes will later be placed. As the support body 14 is lowered onto the blocks, it contacts the bulb 22, which is large enough to extend above the heighth of the blocks as shown by the dotted line position 24 in Fig. 4, and causes the bulb to be forced downwardly thereby creating a pressure in the bulb. This pressure is transmitted to the liquid medium in the channels 13 forcing it upwardly into contact with the electrically conductive film 15. While this embodiment of the invention is particularly desirable with electrically conductive liquids having a concave meniscus it may also be used with the liquids having a convex meniscus.

In reviewing the operation of the device, the container blocks 12 are set on the base plate 11 according to the position at which the electrodes of the article to be tested normally would be placed. The article to be tested is then placed with the electrically conducting film 15 down in contact with the body of liquid or other medium 16 contained in the channel blocks. If desirable, the article may be positioned on the blocks by locating pins or the like not shown. After positioning, power is applied to the spaced liquid baths through the circuit 18 by switch 20. The circuit is completed by the electrically conductive film which bridges between the respective baths. Upon completion of the test, the article is removed from contact with the liquid and may be wiped dry along the areas where the liquid was in contact with the film. In this connection, it is generally desirable to utilize an electrically conducting medium which will not substantially adhere to or react with the film.

While the invention has been described with reference to the electrically conducting films of gold, silver, copper, iron and nickel, it is of course applicable with other types of electrically conducting films such as those of tin oxide, and the like. It is also of course applicable to electrically conducting articles which are not necessarily flat or of any particular contour.

It is to be understood of course that the form of the invention disclosed herein is to be taken as the preferred embodiment thereof, and that various changes in the shape, size and arrangement of parts may be resorted to without departing from the spirit of the invention or the scope of the following claims.

I claim:

1. In equipment for applying electrical power to an electrically conductive film carried by a support body to which permanent electrodes are to be subsequently applied, a plurality of spaced containers containing an electrically conductive liquid, means mounting said containers for movement relative to one another to place said electrically conductive liquid in position such that when the support body is supported on said containers said electrically conductive liquid will contact the electrically conductive film along those areas where said electrodes will be placed, and means connected to said electrically conductive liquid to bring electrical power thereto.

2. Apparatus for applying a voltage potential across an electrically conductive film carried by a support body along the marginal surface portions of the film to which permanent electrodes are to be subsequently applied, comprising a plurality of containers containing an electrically conductive medium, said electrically conductive medium being substantially inert to said containers, said containers being mounted for movement relative to one another to place said medium in contact with only those marginal surface portions of said electrically conductive film to which the permanent electrodes are to be applied, and means connected to said electrically conductive medium to establish a potential across at least a portion of the electrically conductive film on said support body.

3. Apparatus as claimed in claim 2, wherein the electrically conductive medium in the containers is a liquid having a convex meniscus, said convex meniscus contacting the marginal surface portions of said film.

4. Apparatus as claimed in claim 2, wherein the electrically conductive medium is chosen from the group consisting of gallium, cesium and rubidium.

5. Apparatus as claimed in claim 2, wherein means are connected to the electrically conductive medium for placing said electrically conductive medium under pressure.

6. Apparatus for determining the electrical resistance of an electrically conducting film on the surface of a support body to which bus bars are to be permanently attached, comprising spaced members having elongated channels therein supporting said support body, said channels having upwardly facing edges in contact with said support body, means mounting said spaced members for movement relative to one another, a pliable bath of an electrically conductive medium contained in each of said channels having an exposed upper surface extending above said upwardly facing edges and in contact with said electrically conducting film along the areas where said bus bars are to be attached, and an electrical circuit including a resistance measuring instrument connecting said baths.

References Cited in the file of this patent
UNITED STATES PATENTS

| | | |
|---|---|---|
| 972,542 | Koch | Oct. 11, 1910 |
| 1,897,330 | Pender | Feb. 14, 1933 |
| 2,049,306 | Matson | July 28, 1936 |
| 2,379,947 | Bandur | July 10, 1945 |
| 2,628,299 | Gaiser | Feb. 10, 1953 |
| 2,679,569 | Hall | May 25, 1954 |